March 15, 1960   D. E. KREINHEDER   2,929,065
SURFACE WAVE ANTENNA
Filed Feb. 27, 1957

INVENTOR.
Donald E. Kreinheder,
By
AGENT

United States Patent Office 2,929,065
Patented Mar. 15, 1960

2,929,065

SURFACE WAVE ANTENNA

Donald E. Kreinheder, Los Angeles, Calif., assignor to Hughes Aircraft Company, Culver City, Calif., a corporation of Delaware Application February 27, 1957, Serial No. 642,779

3 Claims. (Cl. 343—785)

The invention relates to surface wave antennas, and more particularly to a surface wave transmission line adapted to radiate a broadside wave energy beam.

As is well known to those skilled in the art, electromagnetic wave energy may be propagated over a metallic ground plane as a surface wave. The wave energy so propagated is confined to the ground plane by affixing a suitable trapping agent thereto such as a coating of a low-loss dielectric or a plurality of transverse metallic corrugations.

One of the characteristics of a surface wave is that its phase velocity is less than the corresponding phase velocity in free space. For this reason surface waves are often referred to as slow waves. As a result of this characteristic, conventional surface wave antennas radiate end-fire wave energy beams. The reason that an end-fire wave energy beam is radiated may be understood physically by noting that since the waves are slow, there is no real angle at which radiation could emerge in phase. Conventional surface wave antennas have been found very desirable and have been used extensively as flush-mounted antennas for high speed aircraft and for low silhouette antennas for ground and ship installation.

It is an object of this invention to provide a surface wave antenna adapted to radiate a broadside wave energy beam.

It is another object of this invention to provide a broadside wave energy antenna array which may be flush-mounted to a support structure and wherein the cross coupling between individual array elements is small.

It is a further object of this invention to provide a broadside type surface wave antenna having excellent broad band characteristics, being of simple mechanical design and providing an easily controllable radiation pattern.

In accordance with one embodiment of this invention a surface wave of electromagnetic energy is confined within a narrow dielectric path and propagated over a metallic ground plane. The wave energy so propagated excites a plurality of dipole radiators spaced substantially equidistant along the length of the dielectric path. The dipoles are spaced such that the wave energy radiated from the individual dipoles combines to provide a broadside wave energy beam in much the same manner as a radiation pattern is obtained from slot radiators cut into the wall of a hollow waveguide.

The novel features which are believed to be characteristic of the invention, both as to its organization and method of operation, together with further objects and advantages thereof, will be better understood from the following description considered in connection with the accompanying drawing in which several embodiments of the invention are illustrated by way of example. It is to be expressly understood, however, that the drawing is for the purpose of illustration and description only, and is not intended as a definition of the limits of the invention.

Figure 1:
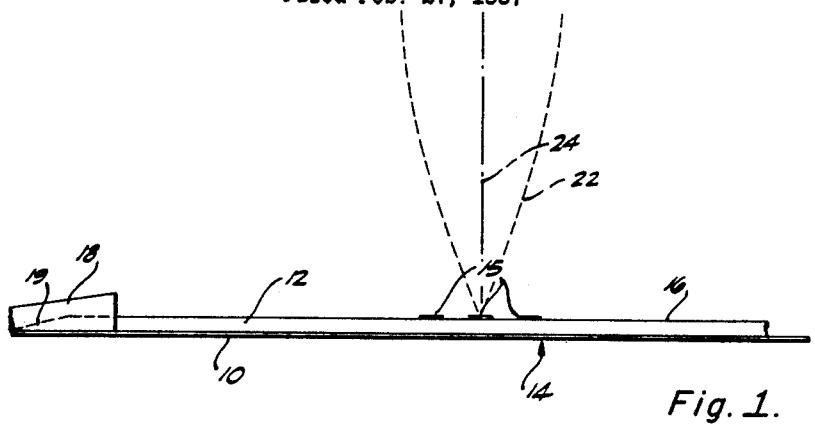
Figs. 1 and 2 are an elevation and plan view, respectively, of a surface wave antenna in accordance with this invention.
Figure 2:
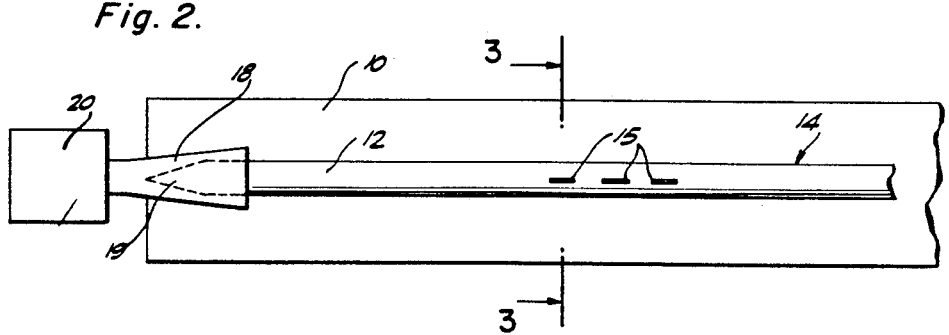
Figure 5:
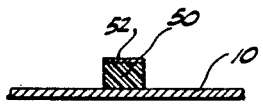
Figs. 4–7 are cross sections of alternative embodiments of the surface wave antenna of this invention.
Figure 3:
Fig. 3 is a cross sectional view taken along the line 3—3 of Fig. 2.
Figure 6:
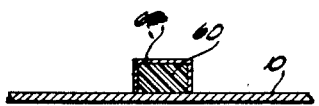
Figure 7:
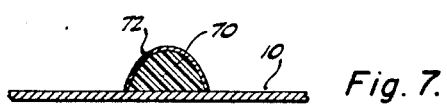

Referring now to the drawing wherein like reference characters designate like elements, there is shown in Figs. 1 to 3 a surface wave antenna comprising a ground plane 10 which may be a plane conducting sheet and bonded thereto a low-loss dielectric rod 12 of semicircular cross section as clearly shown in Fig. 3. The combination of the ground plane 10 and the dielectric rod 12 forms a narrow surface wave transmission line 14. A plurality of metallic radiating elements 15 of which three are shown in the drawing are mechanically affixed as by bonding to the surface 16 of the dielectric rod 12. The radiating elements 15 as clearly shown in Fig. 2 may be rectangular pieces of metallic foil. An electromagnetic horn 18 couples the surface wave transmission line 14 to a wave energy source 20.

The metallic radiating elements 15 may be made of thin foil which are easily affixed to the dielectric rod 12 by bonding. The length of each of the elements 15 is approximately equal to one-half of the working wavelength of the surface wave propagated through the transmission line 14 to provide dipole action. The spacing between the mid-point of each of the elements or dipoles 15 is approximately equal to the working wavelength of of the surface wave propagated through the transmission line 14. The width of the elements 15 may vary within wide limits and is usually chosen experimentally to provide the desired degree of electromagnetic coupling between the elements 15 and the transmission line 14.

The operation of the antenna of this invention will now be described. Electromagnetic wave energy is provided by the source 20 which feeds the horn 18 coupled thereto in the $TE_{01}$-mode. The horn 18 may be an H-plane sectoral horn as here shown having as one of its flared walls the ground plane 10. The portion of the dielectric rod 12 within the horn is tapered as illustrated by dotted lines 19 to provide a smooth mode transducer section between the horn 18 and the transmission line 14. Electromagnetic wave energy passing through the transducer section is transformed from a $TE_{01}$-mode to a surface wave type mode. The surface wave is propagated through the dielectric rod 12 over the ground plane 10 except for normal leakage. As the surface wave proceeds through the narrow surface wave transmission line 14, it excites the metallic radiating elements 15, which excitation causes the generation of an alternating current in the direction of wave propagation. Such a current as is well known in the art will produce radiation of electromagnetic waves into free space, each of the elements 15 acting as a radiating dipole.

To provide a symmetrical broadside radiation pattern as shown by the radiation pattern 22 having a beam axis 24, it is usually necessary to have each dipole 15 contribute an equal amount of wave energy. Similarly, to increase the gain of the radiation pattern or to reduce the side lobe level, it is desirable to control the magnitude of the contribution of each individual dipole. Such control is easily obtainable in the surface wave antenna herein described by adjusting the width of the individual radiation elements 15. The greater the width, the greater the degree of coupling to the transmission line 14 and the greater the amount of excitation of the dipole. To obtain uniform radiation, the width of the individual elements may be progressively increased so that the increased coupling provides the necessary compensation for the decrease in the magnitude of surface wave suffered by exciting previous dipoles.

Figure 4:
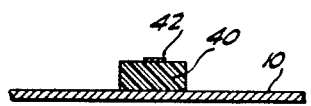

Figs. 4-7 illustrate alternative embodiments of the transmission line 14 of Figs. 1 to 3. Fig. 4 provides a transmission line having a dielectric rod 40 of rectangular cross section bonded to the ground plane 10. The radiating element 42 is flat and provides the dipole. Similarly, the dielectric rods 50, 60 and 70 of Figs. 5, 6 and 7, respectively, are of square, rectangular and parabolic cross section. The radiating elements 52, 62, and 72 affixed to the dielectric rods 50, 60, and 70, respectively show possible configuration of the dipoles. The radiating elements 62 and 72 are examples of dipole radiation proving maximum coupling. To this end the radiating elements 62 and 72 extend over the whole surface of the dielectric rods 60 and 70 respectively coextensive with their length.

The surface wave antenna described herein and illustrated in the drawing is adapted to radiate a broadside beam of wave energy. Although the antenna has been described as a transmitting antenna it may also be used as a receiving antenna. One of the advantages of the antenna of this invention is the ease whereby the antenna may be manufactured. Another advantage of this invention is the small degree of cross coupling between dipoles which make the radiation pattern easily controllable by individually adjusting the width of each of the dipole elements.

What is claimed is:

1. A surface wave antenna adapted to radiate a beam of electromagnetic wave energy having a beam angle substantially perpendicular to the direction of propagation of the surface wave within said surface wave antenna, said antenna comprising: a metallic ground plane, an elongated dielectric rod bonded to said ground plane and providing therewith a narrow surface wave transmission line, a source of electromagnetic wave energy coupled to said ground plane and adapted to excite a surface wave within said transmission line, and a plurality of thin metallic foil radiation elements affixed at spaced positions axially on a surface of the dielectric rod portion of said transmission line and adapted to be excited by said surface wave, each of said elements having a length substantially equal to one-half of the working wavelength of said surface wave and the distance between the midpoint of any two adjacent elements being substantially equal to a working wavelength of said surface wave.

2. A surface wave antenna adapted to radiate a beam of electromagnetic wave energy having a beam angle substantially perpendicular to the direction of propagation of the surface wave within said surface wave antenna, said antenna comprising: a metallic ground plane, an elongated dielectric rod bonded to said ground plane and providing therewith a narrow surface wave transmission line, a source of electromagnetic wave energy, an H-plane sectoral horn coupling said source to said ground plane and adapted to excite a surface wave within said transmission line, and a plurality of thin metallic foil radiation elements affixed to the surface of said dielectric rod at separate points along said transmission line and adapted to be excited by said surface wave, each of said elements having a length along said rod substantially equal to one-half of the working wavelength of said surface wave and the distance between the midpoint of any two adjacent elements being substantially equal to a working wavelength of said surface wave, the width of each of said elements becoming progressively larger along the direction of propagation of said surface wave so that each of said elements contributes a substantially equal share to said beam.

3. A surface wave antenna comprising: a metallic ground plane, a narrow elongated dielectric member bonded to said ground plane, a plurality of thin metallic foil elements bonded to the surface of said dielectric member at separate points along the length thereof, and means coupled to said dielectric member and adapted to excite therein a surface wave, the center of said elements being separated a distance substantially equal to the working wavelength of said surface wave, and each element having a length substantially equal to one-half of the working wavelength of said surface wave.

References Cited in the file of this patent
UNITED STATES PATENTS

| | | |
|---|---|---|
| 2,624,003 | Iams | Dec. 30, 1952 |
| 2,783,467 | Gutton et al. | Feb. 26, 1957 |
| 2,840,819 | McClellan | June 24, 1958 |